(12) United States Patent
Kawatsu et al.

(10) Patent No.: US 11,692,910 B2
(45) Date of Patent: Jul. 4, 2023

(54) ABNORMALITY DIAGNOSTIC DEVICE, ABNORMALITY DIAGNOSTIC METHOD, AND PROGRAM

(71) Applicant: Japan Aerospace Exploration Agency, Tokyo (JP)

(72) Inventors: Kaname Kawatsu, Chofu (JP); Seiji Tsutsumi, Chofu (JP); Miki Hirabayashi, Chofu (JP)

(73) Assignee: JAPAN AEROSPACE EXPLORATION AGENCY

( * ) Notice: Subject to any disclaimer, the term of this patent is extended or adjusted under 35 U.S.C. 154(b) by 0 days.

(21) Appl. No.: 17/288,602

(22) PCT Filed: Oct. 29, 2019

(86) PCT No.: PCT/JP2019/042249
§ 371 (c)(1),
(2) Date: Apr. 26, 2021

(87) PCT Pub. No.: WO2020/090767
PCT Pub. Date: May 7, 2020

(65) Prior Publication Data
US 2021/0348985 A1 Nov. 11, 2021

(30) Foreign Application Priority Data
Oct. 30, 2018 (JP) .................................. 2018-204502

(51) Int. Cl.
*G01M 99/00* (2011.01)
*G05B 23/02* (2006.01)

(52) U.S. Cl.
CPC .......... *G01M 99/00* (2013.01); *G05B 23/0243* (2013.01)

(58) Field of Classification Search
CPC ............... G01M 99/00; G05B 23/0205; G05B 23/0235; G05B 23/024; G05B 23/0243;
(Continued)

(56) References Cited

U.S. PATENT DOCUMENTS 9,107,586 B2* 8/2015 Tran ..................... A61B 5/7271
9,916,538 B2* 3/2018 Zadeh .................. A61B 5/7221
(Continued)

FOREIGN PATENT DOCUMENTS

JP H09-205429 A 8/1997
JP 2005-149006 A 6/2005
(Continued)

OTHER PUBLICATIONS

International Search Report dated Jan. 21, 2020 in corresponding PCT International Application No. PCT/JP2019/042249.
(Continued)

*Primary Examiner* — Feba Pothen
*Assistant Examiner* — Martin Walter Braunlich
(74) *Attorney, Agent, or Firm* — Ostrolenk Faber LLP

(57) ABSTRACT

An abnormality diagnostic device includes a diagnoser configured to diagnose a type of abnormality that occurs in an abnormality diagnostic target on the basis of differences between abnormality simulation results for each type of abnormalities obtained by simulating a plurality of types of abnormalities in the abnormality diagnostic target and a plurality of time-series observation results obtained by observing the abnormality diagnostic target in time series using a plurality of detectors.

8 Claims, 10 Drawing Sheets

(58) Field of Classification Search
CPC ............ G06F 11/0751; G06F 11/0775; G06F 11/079; G06F 16/22; G06F 16/2237; G06N 7/00; G06N 7/005; G06N 20/00
See application file for complete search history.

(56) References Cited

U.S. PATENT DOCUMENTS

| | | |
|---|---|---|
| 2015/0106655 A1 | 4/2015 | Zhao et al. |
| 2015/0272509 A1* | 10/2015 | Kwon .................... G16H 50/20 600/509 |
| 2017/0092021 A1* | 3/2017 | Nielsen ................ G05B 23/024 |

FOREIGN PATENT DOCUMENTS

| | | |
|---|---|---|
| JP | 2006-106870 A | 4/2006 |
| JP | 2007-189644 A | 7/2007 |
| JP | 2009-245228 A | 10/2009 |
| JP | 2010-126130 A | 6/2010 |
| JP | 2017-096655 A | 6/2017 |
| JP | 2018-116687 A | 7/2018 |
| WO | WO 2011/148647 A1 | 12/2011 |

OTHER PUBLICATIONS

Written Opinion dated Jan. 21, 2020 in corresponding PCT International Application No. PCT/JP2019/042249.

* cited by examiner

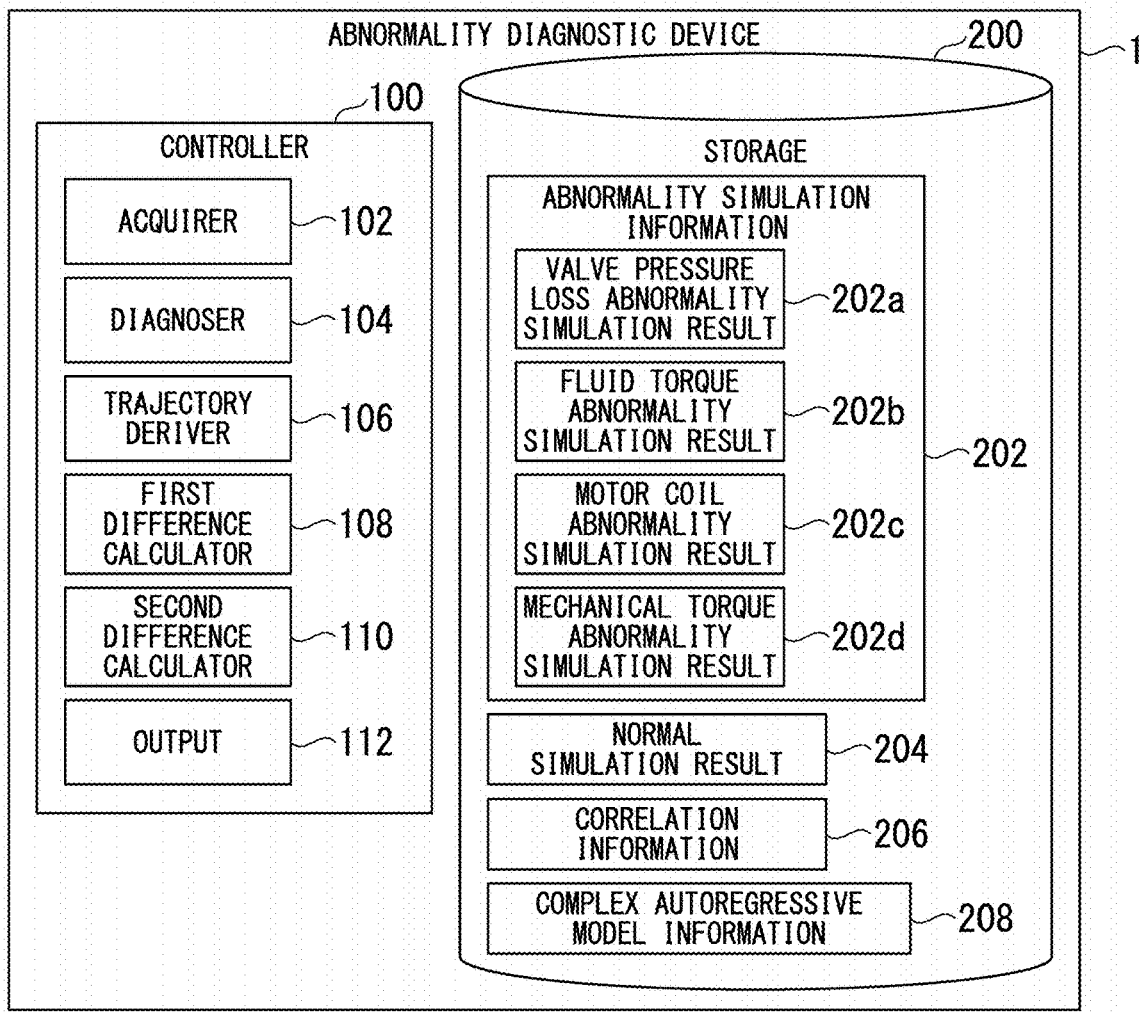

USE OF "VALVE PRESSURE LOSS ABNORMALITY" MODEL:
DISTURBANCE PATTERN 8

USE OF "VALVE PRESSURE LOSS ABNORMALITY" MODEL:
DISTURBANCE PATTERN 2

| USE OF "VALVE PRESSURE LOSS ABNORMALITY" MODEL: DISTURBANCE PATTERN 1 ||
|---|---|
| SENSOR ID: 0001 ||
| SENSOR NAME: TEMPERATURE SENSOR A ||
| ELAPSED TIME | OBSERVED VALUE [°C] |
| hh:mm:ss | XX.XX |
| hh:mm:ss | XX.XX |
| hh:mm:ss | XX.XX |
| hh:mm:ss | XX.XX |
| hh:mm:ss | XX.XX |
| ... | ... |

SENSOR ID: 0002

| SENSOR ID: 0001 ||
|---|---|
| SENSOR NAME: TEMPERATURE SENSOR A ||
| ELAPSED TIME | OBSERVED VALUE [°C] |
| hh:mm:ss | XX.XX |
| hh:mm:ss | XX.XX |
| hh:mm:ss | XX.XX |
| hh:mm:ss | XX.XX |
| hh:mm:ss | XX.XX |
| ... | ... |

ABNORMALITY DIAGNOSTIC DEVICE, ABNORMALITY DIAGNOSTIC METHOD, AND PROGRAM

CROSS-REFERENCE TO RELATED APPLICATIONS

The present application is a 35 U.S.C. §§ 371 national phase conversion of PCT/JP2019/042249, filed Oct. 29, 2019, which claims priority to Japanese Patent Application No. 2018-204502, filed Oct. 30, 2018, the contents of which are incorporated herein by reference. The PCT International Application was published in the Japanese language.

TECHNICAL FIELD

The present invention relates to an abnormality diagnostic device, an abnormality diagnostic method, and a program.

BACKGROUND ART

Conventionally, as a method of diagnosing an abnormality occurring in a target, technology for accumulating information about malfunctions of the target that occurred in the past and diagnosing an abnormality on the basis of a trend in the accumulated information is known (for example, Patent Literature 1).

CITATION LIST

Patent Literature

[Patent Literature 1]
Japanese Unexamined Patent Application, First Publication No. 2010-126130

SUMMARY OF INVENTION

Technical Problem

However, in the conventional technology, there are some cases where it is difficult to diagnose an abnormality in a target when the amount of information related to the target is small, when there is no malfunction information, or when the amount of malfunction information is small.

In the conventional technology, there are some cases where a significant amount of information is required to be accumulated for diagnosing abnormality when the number of devices (for example, sensors) for acquiring information related to an abnormality diagnostic target is large.

One aspect of the present invention have been made in consideration of such circumstances and an objective of the present invention is to provide an abnormality diagnostic device, an abnormality diagnostic method, and a program capable of diagnosing an abnormality in a target without using information about malfunctions that occurred in the past.

Solution to Problem

According to an aspect of the present invention, an abnormality diagnostic device is provided including a diagnoser configured to diagnose a type of abnormality that occurs in an abnormality diagnostic target on the basis of differences between abnormality simulation results for each type of abnormalities obtained by simulating a plurality of types of abnormalities in the abnormality diagnostic target and a plurality of time-series observation results obtained by observing the abnormality diagnostic target in time series using a plurality of detectors.

Advantageous Effects of Invention

According to the present invention, it is possible to diagnose an abnormality in an abnormality diagnostic target without using information about malfunctions that occurred in the past.

BRIEF DESCRIPTION OF DRAWINGS

FIG. 1 is a diagram showing an example of a configuration of an abnormality diagnostic device according to an embodiment.
FIG. 2 is a diagram showing an example of content of observation result information.
FIG. 3 is a diagram showing an example of content of a valve pressure loss abnormality simulation result.
FIG. 4 is a diagram showing an example of content of normal simulation information.

DESCRIPTION OF EMBODIMENTS

Embodiment

Figure 5:
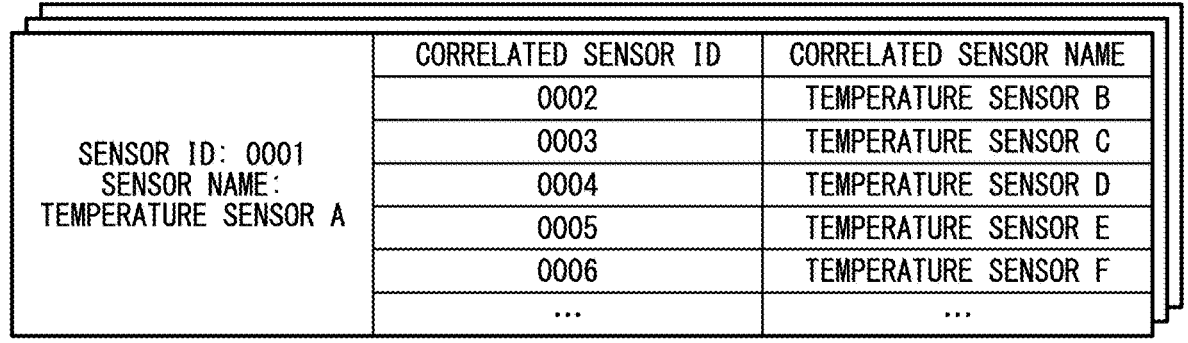
FIG. 5 is a diagram showing an example of content of correlation information.

Hereinafter, embodiments of the present invention will be described with reference to the drawings.
[Overall Configuration]
FIG. 1 is a diagram showing an example of a configuration of an abnormality diagnostic device 1 according to the embodiment. The abnormality diagnostic device 1 diagnoses an abnormality that has occurred or may occur in an abnormality diagnostic target device or system. The abnormality diagnostic device 1 includes, for example, a controller 100 and a storage 200. The controller 100 implements functions of an acquirer 102, a diagnoser 104, a trajectory deriver 106, a first difference calculator 108, a second difference calculator 110, and an output 112, for example, when a hardware processor such as a central processing unit (CPU) executes a program (software) stored in the storage 200. Some or all of these components may be implemented, for example, by hardware (a circuit including circuitry) such as a large-scale integration (LSI) circuit, an application specific integrated circuit (ASIC), a field-programmable gate array (FPGA), or a graphics processing unit (GPU) or may be implemented by software and hardware in cooperation.

The storage 200 may be implemented by, for example, a storage device (a storage device including a non-transient storage medium) such as a hard disk drive (HDD) or a flash memory or may be implemented by a removable storage medium (a non-transient storage medium) such as a DVD or a CD-ROM or may be a storage medium mounted on a drive device. Part or all of the storage 200 may be an external device that can be accessed by the abnormality diagnostic device 1 such as a network attached storage (NAS) or an external storage server. For example, abnormality simulation information 202, normal simulation information 204, correlation information 206, and complex autoregressive model information 208 are stored in the storage 200. Details of various types of information will be described below.

The acquirer 102 acquires information representing a plurality of observation results (hereinafter referred to as observation result information 300) when a plurality of sensors (not shown) disposed in the abnormality diagnostic target device or system have observed a state of an observation target at predetermined time intervals. The observation target is, for example, a physical quantity that changes in the abnormality diagnostic target device or system and the state of the observation target is, for example, a value of the physical quantity. For example, the physical quantity may indicate at least one of mechanical properties, electromagnetic properties, thermal properties, acoustic properties, chemical properties, and the like or may be space information or time information represented thereby. The physical quantity includes, for example, a pressure, a flow rate, a degree of valve opening, an atmospheric pressure, an outside air temperature, a water temperature, a blood pressure, a pulse and the like. The abnormality diagnostic target device or system is, for example, a rocket (for example, a reusable rocket or rocket engine), a transportation system, a power generation device, a life support device, or the like. When the abnormality diagnostic target device is a rocket, a plurality of sensors are provided in the rocket to observe the observation target (the physical quantity) related to the control of the rocket. The abnormality diagnostic target device or system is not limited to the above and may be any device that can acquire the observation target.

For example, the acquirer 102 may acquire the observation result information 300 from a plurality of sensors connected to the abnormality diagnostic device 1, may acquire the observation result information 300 from the connected sensors so that information can be transmitted and received via a network, or may acquire (extract) an observation history of a sensor included in an operation history (for example, log information) of the abnormality diagnostic target whose operation has been completed as the observation result information 300. In the following description, a case in which the acquirer 102 acquires the observation result information 300 from the log information stored in a data logger provided in a reusable rocket will be described. The sensor is an example of a "detector."

FIG. 2 is a diagram showing an example of content of the observation result information 300. In the observation result information 300, for example, information for identifying the sensor (a sensor ID shown in FIG. 2), a sensor name, and an observation result when the sensor has observed the observation target at predetermined time intervals are stored in association with each other separately for each sensor. In FIG. 2, in a sensor having a sensor ID "0001" and a sensor name "temperature sensor A," an observation target is a temperature of an abnormality diagnostic target and the temperature observed by the sensor (for example, a device temperature) is shown in the observation result.

Returning to FIG. 1, the diagnoser 104 diagnoses the type of abnormality that has occurred in the abnormality diagnostic target or that is likely to occur in the abnormality diagnostic target on the basis of a plurality of observation results acquired by the acquirer 102. This abnormality is, for example, an abnormality in an abnormality diagnostic target device or system (hereinafter referred to as a system abnormality).

The trajectory deriver 106, the first difference calculator 108, and the second difference calculator 110 generate indices to be used when the diagnoser 104 diagnoses an abnormality, respectively. Details of the trajectory deriver 106, the first difference calculator 108, and the second difference calculator 110 will be described below.

The output 112 outputs information related to the type of abnormality diagnosed by the diagnoser 104. For example, the output 112 may display an image showing the type of abnormality on a display device (not shown) connected to the abnormality diagnostic device 1, may output information representing the type of abnormality to another device connected via a network, or may cause the storage 200 to store information representing the type of abnormality.

[Process of Diagnoser 104]

Details of the process of the diagnoser 104 will be described below. First, the diagnoser 104 identifies a certain observation result from observation results acquired by the acquirer 102. For example, the diagnoser 104 may identify an observation result of the diagnostic target on the basis of an instruction input by a user via an input device (not shown) connected to the abnormality diagnostic device 1 or may identify observation results in a preset order. The diagnoser 104 diagnoses the type of abnormality that has occurred in the identified abnormality diagnostic target or that is likely to occur in the abnormality diagnostic target on the basis of the identified observation result and simulation results when simulations have been performed using a model for simulating (modeling) the abnormality diagnostic target device or system. In the following description, a case in which the diagnoser 104 diagnoses the type of abnormality that has occurred in the abnormality diagnostic target or is likely to occur in the abnormality diagnostic target may be simply described as a case in which the diagnoser 104 diagnoses the type of abnormality in the abnormality diagnostic target.

For example, in the case of a flow rate control valve driven by an electric motor, the abnormality diagnostic target of the present embodiment is a device including an electric motor, a mechanical component that transmits motive power generated by the electric motor to a transmission, an actuator that converts a rotation motion generated by the electric motor into an expansion/contraction motion, and a valve body driven by the actuator. The diagnoser 104 diagnoses four types of abnormalities such as a "valve pressure loss abnormality" and a "fluid torque abnormality" in the valve body, a "motor coil abnormality" of the electric motor, and a "mechanical torque abnormality" of the actuator that can occur in the abnormality diagnostic target. The abnormalities that can occur in the abnormality diagnostic target are not limited to these four abnormalities.

Details of the simulation result will be described below. The abnormality simulation information 202 is information showing a simulation result using a model for simulating a case in which the abnormality diagnostic target is in an abnormal state (hereinafter referred to as an abnormality simulation result). The abnormality simulation information 202 includes a valve pressure loss abnormality simulation result 202a, a fluid torque abnormality simulation result 202b, a motor coil abnormality simulation result 202c, and a mechanical torque abnormality simulation result 202d.

The valve pressure loss abnormality simulation result 202a is an abnormality simulation result of a model for simulating a state in which the "valve pressure loss abnormality" has occurred in the abnormality diagnostic target. The fluid torque abnormality simulation result 202b is an abnormality simulation result of a model for simulating a state in which the "fluid torque abnormality" has occurred in the abnormality diagnostic target. The motor coil abnormality simulation result 202c is an abnormality simulation result of a model for simulating a state in which the "motor coil abnormality" has occurred in the abnormality diagnostic target. The mechanical torque abnormality simulation result 202d is an abnormality simulation result of a model for simulating a state in which the "mechanical torque abnormality" has occurred in the abnormality diagnostic target.

Because abnormality simulation results (202a to 202d) are simulation results differing according to a model used for simulation but include similar content, the valve pressure loss abnormality simulation result 202a will be described below as an example. FIG. 3 is a diagram showing an example of content of the valve pressure loss abnormality simulation result 202a. The valve pressure loss abnormality simulation result 202a is sensor-specific information representing the simulation result of the observation target in the plurality of sensors disposed in the abnormality diagnostic target. Hereinafter, a case in which the sensor whose observation result is shown in the observation result information 300 and the sensor whose abnormality simulation result is shown in the abnormality simulation information 202 match will be described.

In the valve pressure loss abnormality simulation result 202a, the abnormality simulation result when a plurality of inputs having different disturbance patterns are given to the model for simulating the "valve pressure loss abnormality" is shown for each disturbance pattern. The disturbance is, for example, a difference in an input given to the model caused by an operation timing or an operation situation of the abnormality diagnostic target or an individual difference between abnormality diagnostic targets. In FIG. 3, a case in which input disturbance patterns of the "valve pressure loss abnormality" model are eight patterns of disturbance pattern Nos. 1 to 8 is shown. Therefore, in the valve pressure loss abnormality simulation result 202a, the abnormality simulation result when an input in which the disturbance of each pattern occurs is given to the model is shown for each disturbance pattern.

FIG. 4 is a diagram showing an example of content of the normal simulation information 204. The normal simulation information 204 is sensor-specific information representing a simulation result using a model for simulating a case in which the abnormality diagnostic target is in the normal state (hereinafter referred to as a normal simulation result). The normal simulation information 204 indicates a normal simulation result when an input including disturbance is given to a model for simulating the normal state of the abnormality diagnostic target.

On the basis of the observation result and the simulation result, the diagnoser 104 diagnoses a type of abnormality in the abnormality diagnostic target using a dissimilarity distance evaluated according to (1) a method using a dissimilarity distance evaluated according to a known method such as a complex power cepstrum and (2) a known method such as dynamic time warping (DTW) (a dynamic time warping). Details of each method will be described below.

[Regarding (1) Method Using Dissimilarity Distance Evaluated According to Complex Power Cepstrum or Like]

Hereinafter, content of a process in which the diagnoser 104 diagnoses a type of abnormality according to (1) the method using the dissimilarity distance evaluated according to the complex power cepstrum or the like will be described. First, the diagnoser 104 identifies an observation target (hereinafter referred to as a first observation target) observed by a certain sensor (hereinafter referred to as a first sensor) from the observation result information 300 acquired by the acquirer 102. The diagnoser 104 identifies an observation result (hereinafter referred to as a second observation result) of a sensor (hereinafter referred to as a second sensor) for observing an observation target (hereinafter referred to as a second observation target) correlated with the first sensor on the basis of the correlation information 206. Only one of a plurality of sensors can be selected for the second observation target or a plurality of sensors can be collectively selected for the second observation target. Also, a sensor that does not correlate with the first sensor can be selected for the second observation target. Because analysis can be performed more quickly by selecting a correlated sensor, a case in which a correlated sensor is selected will be described below.

FIG. 5 is a diagram showing an example of content of the correlation information 206. The correlation information 206 is, for example, sensor-specific information representing sensors whose observation results are correlated with each other. In FIG. 5, sensors having observation results correlated with a sensor having the sensor ID "0001" and a sensor name "temperature sensor A" are sensors having the sensor IDs "0002" to "0006" and sensor names "temperature sensors B to F." A sensor whose observation result is correlated with a certain sensor is, for example, a sensor that observes an observation target whose type is the same as a type of observation target of the certain sensor or a sensor (for example, a "current sensor") that observes a different type of observation target (for example, a "current") that changes in accordance with a change in the observation target (for example, a "voltage") of the certain sensor (for example, a "voltage sensor").

Even if a type of observation target is the same as a type of observation target of the first sensor or a type of observation target that changes in accordance with a change in the first observation target, a sensor whose observation result is uncorrelated due to an installation location or an installation environment may not be included in the correlation information 206.

For example, when the first sensor is "temperature sensor A," the diagnoser 104 identifies "temperature sensors B to F" as second sensors correlated with "temperature sensor A" which is the first sensor with reference to the correlation information 206. Although the diagnoser 104 may first perform a process by setting a certain sensor as the second sensor and then perform a process by setting other sensors as the second sensors when there are a plurality of sensors correlated with "sensor A" which is the first sensor, the diagnoser 104 can also perform a process by integrating the plurality of sensors. Hereinafter, a case in which the diagnoser 104 executes the diagnosis using "sensor B" as the second sensor when there are two correlated sensors will be described.

The trajectory deriver 106 performs a principal component analysis (PCA) process using a principal component analysis method in time-series multivariate data with respect to a first observation result and a second observation result identified by the diagnoser 104. For example, the trajectory deriver 106 reconstructs a set of bivariate data having a time index as a two-dimensional vector showing the first observation result as a first element and showing the second observation result as a second element. A feature is extracted by executing a PCA process on the above data (which is converted into a set of bivariate data in which the first observation result is the first element and the second observation result is the second element every time the value is acquired in the present example). At this time, in a k-variate PCA process, the principal components from the first principal component to the $k^{th}$ principal component can be extracted. Therefore, the trajectory deriver 106 can simultaneously derive a first principal component score and a second principal component score when the bivariate PCA process has been performed on the first observation result and the second observation result. In this way, the trajectory deriver 106 can simultaneously derive principal component scores of a plurality of sensor information elements in one PCA process by reconstructing observation results obtained from the plurality of sensors to multivariate data.

The trajectory deriver 106 may reconstruct single sensor information to multivariate data to perform the PCA process by introducing a lag structure using sliding window methods with respect to the first observation result and the second observation result instead of a PCA process of reconstructing the first observation result and the second observation result to bivariate data and collectively executing the bivariate data. The trajectory deriver 106 may reconstruct the first observation result obtained by reconstructing single sensor information to multivariate data using the sliding window method and performing a PCA process on the multivariate data and the second observation result obtained by reconstructing single sensor information to multivariate data using the sliding window method and performing a PCA process on the multivariate data to bivariate data and collectively execute a PCA process on the bivariate data.

Hereinafter, it is assumed that first or second observation results include m observation results (m is a natural number) acquired at the same timing at predetermined time intervals. Therefore, when the PCA process has been executed using a method of the PCA process on the time-series multivariate data with respect to the first observation result and the second observation result described above, first and second principal component scores derived by the trajectory deriver 106 for m sets are obtained. In the following description, first principal component scores of "sensor A" and "sensor B" derived by the trajectory deriver 106 are described as first principal component scores x and second principal component scores of "sensor A" and "sensor B" are described as second principal component scores y.

Because principal components from the first principal component to the $k^{th}$ principal component can be extracted in the k-variate PCA process, the trajectory deriver 106 is not limited to the first principal component score and the second principal component for use in the subsequent analysis and may use any one of a third principal component score, a fourth principal component score, . . . , a $k^{th}$ principal component score (k is a natural number) for the subsequent analysis.

The trajectory deriver 106 may convert time-series univariate information into a set of vectors having a measured value of a near point called a partial time series as an element using a sliding window method which is known technology or the like. The trajectory deriver 106 reconstructs the detection result as multivariate data having a measured value of a near point as a variable. When multivariate analysis is performed on the detection result reconstructed in the sliding window method using the principal component analysis method in which a plurality of mode information elements can be acquired, the trajectory deriver 106 not only can incorporate a time structure (a lag structure) in the principal component analysis result but also can acquire a plurality of mode information elements from detection results as many as the number of window widths. Details of the sliding window method will be described below. The plurality of mode information elements obtained as described above show abnormalities having different properties (a change in periodicity, incorporation of irregular noise, a change in a measured value, and the like).

In the following description, as a process that is performed by the trajectory deriver 106, a process of vectorizing time-series information of a single sensor using a lag structure to reconstruct the vectorized information to multivariate data and acquiring mode information using a multivariate analysis method in which a plurality of mode information acquisitions are possible (for example, principal component analysis, kernel principal component analysis, fuzzy principal component analysis, sparse principal component analysis, probabilistic principal component analysis, robust principal component analysis, or the like) will be described as a "sensor-specific principal component score acquisition process." On the other hand, as a process that is performed by the trajectory deriver 106, a process of collectively vectorizing time-series information of two or more sensors into vectors for each time to reconstruct the vectorized information to multivariate data and acquiring mode information using a multivariate analysis method in a general time domain to be executed by treating the multivariate data as a plurality of independent multivariate data elements will be described as a "sensor-group-specific principal component score acquisition process."

When multivariate analysis is performed by integrating two or more sensors according to the "sensor-group-specific principal component score acquisition process," the trajectory deriver 106 can acquire mode information according to a point of view different from that of the "sensor-specific principal component score acquisition process." When the "sensor-group-specific principal component score acquisition process" using the principal component analysis is performed, the trajectory deriver 106 can acquire a plurality of mode information elements as many as the number of sensors used in the reconstruction of the multivariate data differently from a case in which mode information elements as many as the number of window widths are extracted when the sliding window method is used in the "sensor-specific principal component score acquisition process" using principal component analysis. Because the trajectory deriver 106 acquires mode information on the basis of detection results of a plurality of sensors at once in the "sensor-group-specific principal component score acquisition process," it is possible to implement labor-saving in calculation when the number of sensors provided in the abnormality detection target is large as compared with the "sensor-specific principal component score acquisition process" of acquiring sensor-specific mode information.

The trajectory deriver 106 sets a detection result before the mode information acquisition process on a detection result of a single sensor represented in the observation result information 300 (hereinafter referred to as $0^{th}$-order mode information) or data obtained by standardizing the detection result of the sensor (hereinafter referred to as standardized $0^{th}$-order mode information) as target data of the "sensor-specific principal component score acquisition process." For example, the trajectory deriver 106 sets the "$0^{th}$-order mode information," the "standardized $0^{th}$-order mode information," "first- to higher-order mode information which is sensor-specific principal component score acquisition results," "first- to higher-order mode information which is standardized sensor-specific principal component score acquisition results," and the like as target data of the "sensor-specific principal component score acquisition process."

The trajectory deriver 106 can take a lag structure lost in the "sensor-specific principal component score acquisition process" by performing the "sensor-group-specific principal component score acquisition process" using data on which the "sensor-specific principal component score acquisition process" has been performed as described above. This is due to the following reasons. The lag structure is incorporated in "sensor-specific principal component score acquisition process" data obtained by reconstructing the data using the sliding window method and performing multivariate analysis. On the other hand, in the case of the "sensor-group-specific principal component score acquisition process," the trajectory deriver 106 collectively vectorizes time-series information of two or more sensors for each time and reconstructs the vectorized information to multivariate data, so that a time correlation between data elements is lost. The trajectory deriver 106 can recover a lost time correlation at the time of mode information acquisition using a result of the "sensor-specific principal component score acquisition process" in which the lag structure is introduced as the time-series information of the sensor in the "sensor-group-specific principal component score acquisition process."

The trajectory deriver 106 performs the "sensor-specific principal component score acquisition process" to be executed with respect to each sensor or the "sensor-group-specific principal component score acquisition process" to be executed with respect to a combination of two or more sensors on the basis of the observation result information 300 acquired by the acquirer 102 and extracts features of various abnormalities such as an abnormality for which a threshold value is not set and an abnormality for which the setting of a threshold value is difficult (a change in periodicity, incorporation of irregular noise, and the like) according to a plurality of mode information elements.

Figure 7:
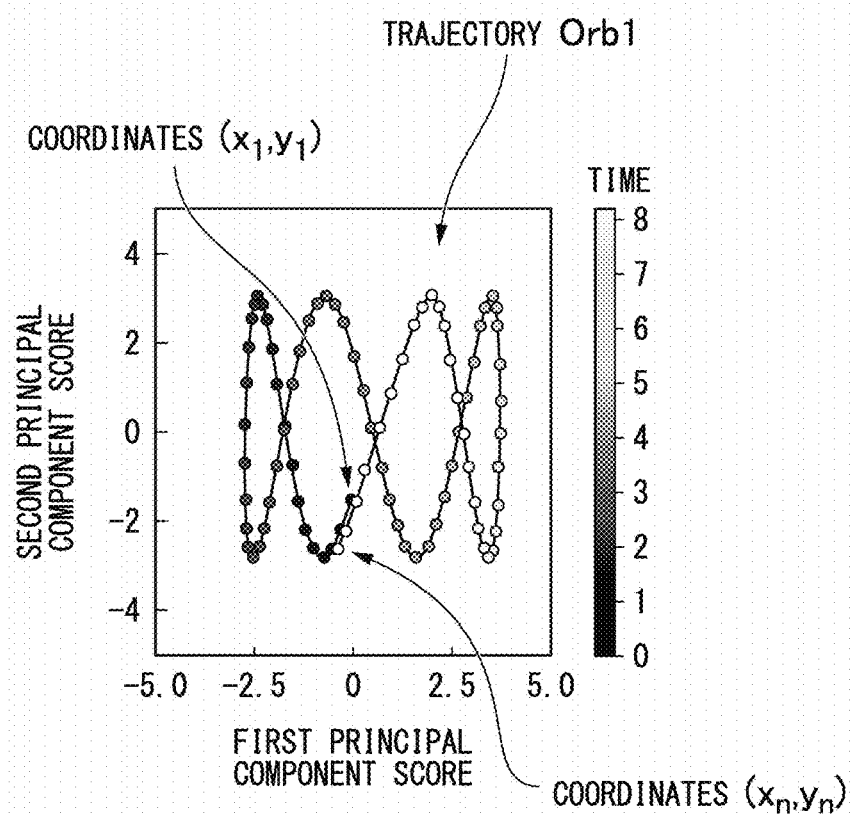
FIG. 7 is a diagram showing an example of a shape of a trajectory on a phase plane in a normal state.

The trajectory deriver 106 derives a trajectory in which coordinates (coordinates (x1, y1), . . . , coordinates (xm, ym) shown in FIG. 7) representing elements whose observation timings match among elements {x1, x2, . . . , xm} included in a first principal component score x and elements {y1, y2, . . . , ym} included in a second principal component score y on a phase plane in which a first axis (for example, the horizontal axis) represents the first principal component score x and a second axis (for example, the vertical axis) represents the second principal component score y are connected by a straight line.

Figure 6:
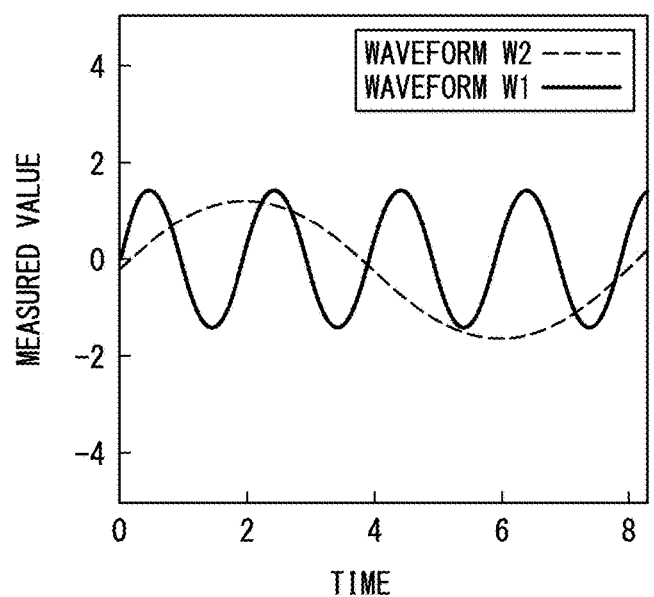
FIG. 6 is a graph showing an example of a change over time in an observation result of a sensor in a normal state.

FIG. 6 is a graph showing an example of a change over time in the sensor in a normal state. As shown in FIG. 6, a waveform W1 is a waveform showing a change over time in a detection result of "sensor A" and a waveform W2 is a waveform showing a change over time in a detection result of "sensor B."

FIG. 7 is a diagram showing an example of a shape of a trajectory on the phase plane in the normal state. The trajectory deriver 106 generates a trajectory (a trajectory Orb1 shown in FIG. 7) in which coordinates (coordinates (x1, y1), . . . , coordinates (xm, ym) shown in FIG. 7) representing the elements of the first principal component score x and the elements of the second principal component score y on a phase plane in which the horizontal axis represents the first principal component score x derived on the basis of a result of the sensor-group-specific principal component score acquisition process and the vertical axis represents the second principal component score y are connected by a straight line in time-series order.

The trajectory deriver 106 may derive the first principal component score x and the second principal component score y after a process of aligning the mean and the variance is performed when a first observation target of the first sensor "sensor A" and a second observation target of the second sensor "sensor B" that provide the original data when the trajectory is derived are different (for example, a temperature, a pressure, and the like). In this case, for example, the trajectory deriver 106 performs a PCA process on a standardized first observation target and a standardized second observation target and derives the first principal component score x and the second principal component score y.

Although a case in which the trajectory deriver 106 derives the first principal component score x and the second principal component score y on the basis of a case in which bivariate analysis is performed according to the sensor-group-specific principal component score acquisition process has been described, the present invention is not limited thereto. If it is possible to determine the shape of the trajectory in the normal state and the shape of the trajectory in the abnormal state, the trajectory deriver 106 may derive a trajectory by combining different principal component analysis results (for example, a third principal component score from a third principal component, a $k^{th}$ principal component score from a $k^{th}$ principal component, and the like) on the basis of other principal components (for example, the first principal component, the second principal component, . . . , the $k^{th}$ principal component) when k sensor information elements are handled. The trajectory deriver 106 may derive a trajectory using the result of the sensor-specific principal component score acquisition process.

The trajectory deriver 106 identifies an abnormality simulation result of the first sensor ("sensor A" in the present example) and an abnormality simulation result of the second sensor ("sensor B" in the present example) on the basis of the abnormality simulation information 202. Here, as described above, the abnormality simulation information 202 includes abnormality simulation results when an input of occurrence of disturbances of disturbance patterns Nos. 1 to 8 has been given to a model for simulating a state in which the "valve pressure loss abnormality," the "fluid torque abnormality," the "motor coil abnormality," and the "mechanical torque abnormality" occur in the abnormality diagnostic target. Therefore, the trajectory deriver 106 identifies abnormality simulation results of 8 patterns with respect to each of four abnormal states (i.e., 32 abnormality simulation results) as abnormality simulation results of each of the first sensor and the second sensor.

The trajectory deriver 106 performs a PCA process on each of the identified abnormality simulation results and derives a trajectory (hereinafter referred to as a trajectory Orb2). In the present example, the trajectory deriver 106 derives 32 trajectories Orb2 on the basis of 32 abnormality simulation results. Because a process in which the trajectory deriver 106 derives the trajectory Orb2 is similar to a process of deriving the above-described trajectory Orb1, description thereof will be omitted. The trajectory Orb1 is an example of the "first trajectory" and the trajectory Orb2 is an example of the "second trajectory."

The first difference calculator 108 extracts shapes of all trajectories derived by the trajectory deriver 106 and converts each of the extracted trajectory shapes into a complex autoregressive model. For example, the trajectory deriver 106 converts the trajectory shown on the phase plane into an image of a predetermined size (or a predetermined number of pixels) and extracts a shape of the trajectory (a contour line (an edge)) on the basis of the brightness of each pixel (a pixel value) when the image obtained through the conversion is a grayscale image. The first difference calculator 108 derives an $m^{th}$-order complex autoregressive model when a point sequence obtained by tracing the contour line of the extracted trajectory is represented by Eq. (1) and a complex expression thereof is represented by Eq. (2). As shown in Eq. (3), the $m^{th}$-order complex autoregressive model is defined as a model for approximating the contour points in a linear combination of the contour points before an $m^{th}$ contour point.

[Math. 1]
$$(x_j, y_j)(j = 0, 1, \ldots, N-1) \quad (1)$$

[Math. 2]
$$z_j = x_j + i y_j \quad (2)$$

[Math. 3]
$$z_j = \sum_{k=1}^{m} a_k z_{j-k} + \varepsilon_j \quad (3)$$

$\{a_k\}_{k=1}^{m}$: Complex autoregression coefficient

The first difference calculator 108 converts the shape of the trajectory into a complex autoregressive model for each trajectory derived by the trajectory deriver 106. The first difference calculator 108 derives a complex power cepstrum distance Dc(z1, z2) which is a difference (a distance) between a complex autoregressive model z1 of a certain trajectory obtained through conversion and a complex autoregressive model z2 of a trajectory other than the certain trajectory. The complex power cepstrum distance Dc(z1, z2) is represented by Eq. (4) as a mean square distance between logarithms of spectral envelopes of the complex autoregressive model z1 and the complex autoregressive model z2.

[Math. 4]
$$Dc(z1, z2) = \left| \frac{g_0^{(1)}}{(r_0^{(1)}/N)} - \frac{g_0^{(2)}}{(r_0^{(2)}/N)} \right| + 2 \sum_{j=1}^{N-1} |g_j^{(1)} - g_j^{(2)}|^2 \quad (4)$$

$\{g_j^{(1)}\}_{j=1}^{N-1}$: Complex power cepstrum coefficient of complex autoregressive model z1
$\{g_j^{(2)}\}_{j=1}^{N-1}$: Complex power cepstrum coefficient of complex autoregressive model z2

Figure 8:
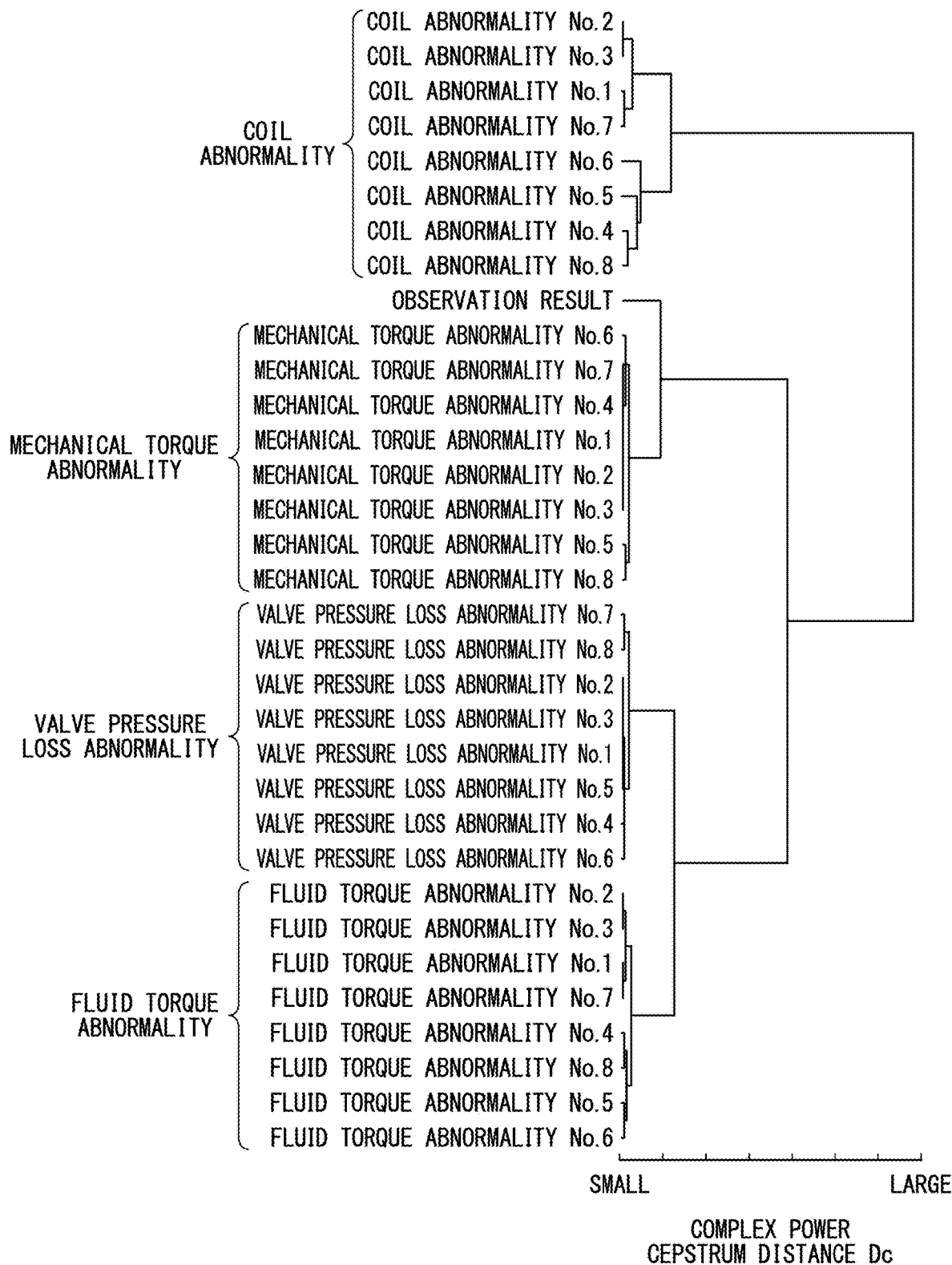
FIG. 8 is a tree diagram showing an example of results classified on the basis of a complex power cepstrum distance classified by a diagnoser.

The first difference calculator 108 derives complex power cepstrum distances Dc related to all combinations in which two certain trajectories are selected from the trajectory Orb1 and a plurality of trajectories Orb2 (32 trajectories in the present example). For example, the diagnoser 104 classifies the complex power cepstrum distances Dc derived by the first difference calculator 108 according to hierarchical clustering. FIG. 8 is a tree diagram showing an example of results classified on the basis of the complex power cepstrum distances Dc classified by the diagnoser 104. In FIG. 8, the complex power cepstrum distance Dc is represented by a length of a branch of the tree diagram. In general, a difference between the two complex autoregressive models tends to increase (i.e., types of abnormalities tend to be heterogeneous) as the value of the complex power cepstrum distance Dc increases and a difference between the two complex autoregressive models tends to decrease (i.e., types of abnormalities tend to be homogenous) as the value of the complex power cepstrum distance Dc decreases. FIG. 8 shows such tendency. In FIG. 8, the complex power cepstrum distance Dc between the complex autoregressive model based on the observation result of the first sensor and the observation result of the second sensor and the complex autoregressive model based on the abnormality simulation result of a model in which the "mechanical torque abnormality" occurs is short. In this case, the diagnoser 104 diagnoses that a type of abnormality in an abnormality diagnostic target is the "mechanical torque abnormality."

In the above description, the first difference calculator 108 may be configured to derive a Euclidean distance, a likelihood ratio distance, or a complex power mel-cepstrum distance on the basis of the complex autoregressive model obtained by transforming the shape of the trajectory. The Euclidean distance, the likelihood ratio distance, and the complex power mel-cepstrum distance are examples of "dissimilarity."

As described above, the first difference calculator 108 is not limited to the complex autoregressive model used for quantifying the shape of the trajectory. Among various methods in which the first difference calculator 108 quantifies the phase plane trajectory shape and calculates the dissimilarity, the complex autoregressive model is a method of extracting only the outer shape of the figure. Thus, for example, when a more detailed determination of the shape of the trajectory is required, the first difference calculator 108 calculates the dissimilarity using a known method such as a neural network in which an internal shape can be extracted in addition to a method of calculating dissimilarity of the phase plane trajectory shape such as DTW in consideration of a time structure.

Although a case in which the trajectory deriver 106 and the first difference calculator 108 derive the trajectory Orb2 on the basis of abnormality simulation results of the first sensor and the second sensor in accordance with the identification of the first sensor and the second sensor by the diagnoser 104 and perform conversion into the complex autoregressive model on the basis of the derived trajectory Orb2 has been described above, the present invention is not limited thereto. For example, a configuration in which a complex autoregressive model may be pre-derived for all combinations of the first sensor and the second sensor which are two sensors by extracting the two sensors from the sensors provided for the abnormality diagnostic target may be adopted. For example, the storage 200 may pre-store complex autoregressive model information 208, which is information representing a complex autoregressive model for each combination. In this case, the diagnoser 104 may identify the complex autoregressive model corresponding to the complex autoregressive model of the trajectory Orb1 derived by the first difference calculator 108 on the basis of the complex autoregressive model information 208 and calculate the complex power cepstrum distance Dc. Hereinafter, a case in which the complex autoregressive model information 208 is stored in the storage 200 will be described.

Thereby, the diagnoser 104 can diagnose a type of abnormality related to a complex autoregressive model having a shortest (smallest) complex power cepstrum distance Dc from the observation result among complex power cepstrum distances Dc between complex autoregressive models derived by the first difference calculator 108 as the type of abnormality in the abnormality diagnostic target and diagnose the abnormality in the abnormality diagnostic target without using information about a malfunction that occurred in the past. Because the diagnoser 104 diagnoses the abnormality diagnostic target on the basis of the abnormality simulation result obtained as the output of the model, it is possible to perform diagnosis robust to a change in a response of the abnormality diagnostic target caused by the bias or time lag of the abnormality diagnostic target device or system.

The diagnoser 104 can perform classification according to a classification method such as hierarchical clustering and diagnose a type of abnormality according to a simpler process by diagnosing a type of abnormality related to a complex autoregressive model having a shortest (smallest) complex power cepstrum distance Dc within the classified cluster as the type of abnormality in the abnormality diagnostic target. Because the diagnoser 104 performs diagnosis on the basis of an observation result of a sensor whose noise is reduced (the trajectory represented by the first principal component score x and the second principal component score y in the present example) by performing a PCA process, it is possible to more accurately diagnose the type of abnormality.

[Regarding (2) Method Using Dissimilarity Distance Evaluated According to DTW or Like]

Hereinafter, content of a process in which the diagnoser 104 diagnoses the type of abnormality according to (2) method using the dissimilarity distance evaluated according to the DTW or the like will be described. The diagnoser 104 diagnoses the type of abnormality on the basis of the dissimilarity distance between the observation result and the abnormality simulation result evaluated according to the DTW or the like. The dissimilarity distance evaluated according to the DTW or the like enables the comparison of time-series data with different lengths, which is a problem in Euclidean distance, and is a distance scale corresponding to a deviation in a time axis direction in the execution of the comparison between optimal points. First, the diagnoser 104 identifies the observation target observed by a certain sensor (hereinafter referred to as the first sensor) from the observation result information 300 acquired by the acquirer 102. The diagnoser 104 identifies an abnormality simulation result corresponding to the identified first observation target from the abnormality simulation information 202. The second difference calculator 110 calculates a dissimilarity distance according to the DTW or the like on the basis of a change over time in the observation result identified by the diagnoser 104 and a change over time in the abnormality simulation result. At this time, it is preferable to perform a process of obtaining a difference from a normal simulation result with respect to the abnormality simulation result and the observation result or a pre-process of calculating a time derivative with respect to the difference or the like before the calculation of the dissimilarity distance according to the DTW or the like so that a feature of the abnormal state is made more prominent.

As described above, the abnormality simulation information 202 includes abnormality simulation results when an input of occurrence of disturbances of disturbance patterns Nos. 1 to 8 has been given to a model for simulating a state in which a "valve pressure loss abnormality," a "fluid torque abnormality," a "motor coil abnormality," and a "mechanical torque abnormality" occur in the abnormality diagnostic target. Therefore, the second difference calculator 110 identifies 32 abnormality simulation results as the abnormality simulation results corresponding to the observation target. The second difference calculator 110 calculates a dissimilarity distance between waveforms related to all combinations in which two certain waveforms are selected on the basis of each waveform representing a change over time in an identified abnormality simulation result and a waveform representing a change over time in an identified observation result. A waveform representing a change over time in the identified observation result is an example of a "first waveform" and a waveform representing a change over time in the identified abnormality simulation result is an example of a "second waveform."

Figure 9:
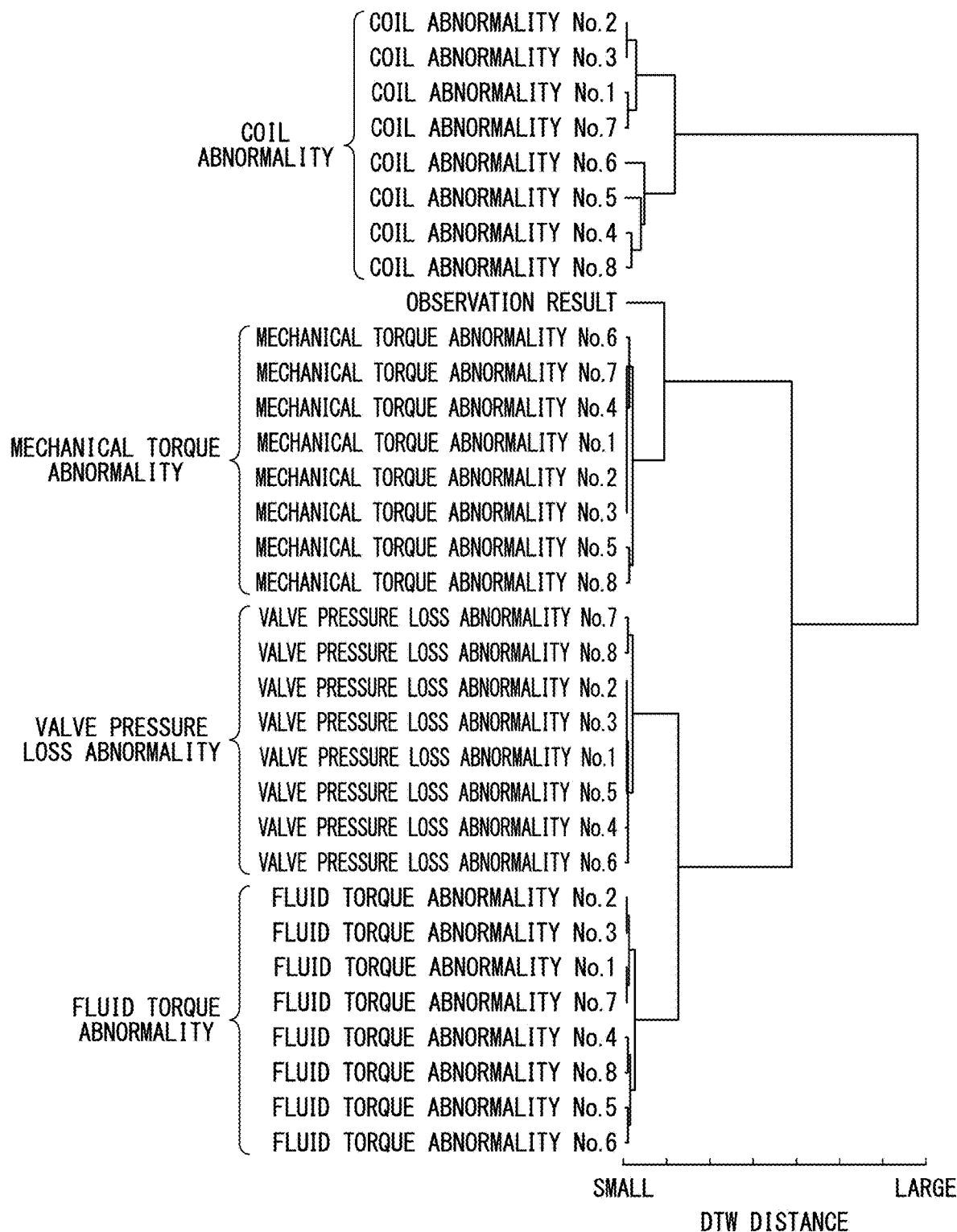
FIG. 9 is a tree diagram showing an example of results classified on the basis of dissimilarity evaluated according to a Dynamic Time Warping by the diagnoser.

The diagnoser 104 classifies the dissimilarity distance evaluated according to the DTW or the like calculated by the first difference calculator 108 in a classification method such as hierarchical clustering. FIG. 9 is a tree diagram showing an example of the results classified by the diagnoser 104 on the basis of the dissimilarity evaluated according to the Dynamic Time Warping. In FIG. 9, the dissimilarity distance is represented by a length of the branch of the tree diagram. In general, a difference between the two waveforms tends to increase (i.e., types of abnormalities tend to be heterogeneous) as the value of the dissimilarity distance increases and a difference between the two waveforms tends to decrease (i.e., types of abnormalities tend to be homogenous) as the value of the dissimilarity distance decreases. FIG. 9 shows such tendency. In FIG. 9, the DTW distance between the waveform of the observation result of the first sensor and the waveform of the abnormality simulation result of the model in which the "mechanical torque abnormality" occurs is short (small). In this case, the diagnoser 104 diagnoses that the type of abnormality in the abnormality diagnostic target is the "mechanical torque abnormality."

Thereby, the diagnoser 104 can diagnose a type of abnormality related to a waveform having a shortest (smallest) dissimilarity distance from the waveform based on the observation result among dissimilarity distances between waveforms derived by the second difference calculator 110 as the type of abnormality in the abnormality diagnostic target and diagnose the abnormality in the abnormality diagnostic target without using information about a malfunction that occurred in the past.

The diagnoser 104 can perform classification according to a classification method such as hierarchical clustering and diagnose a type of abnormality according to a simpler process by diagnosing a type of abnormality related to a waveform having a shortest (smallest) dissimilarity distance within classified clusters as the type of abnormality in the abnormality diagnostic target.

[Processing Flow]

Figure 10:
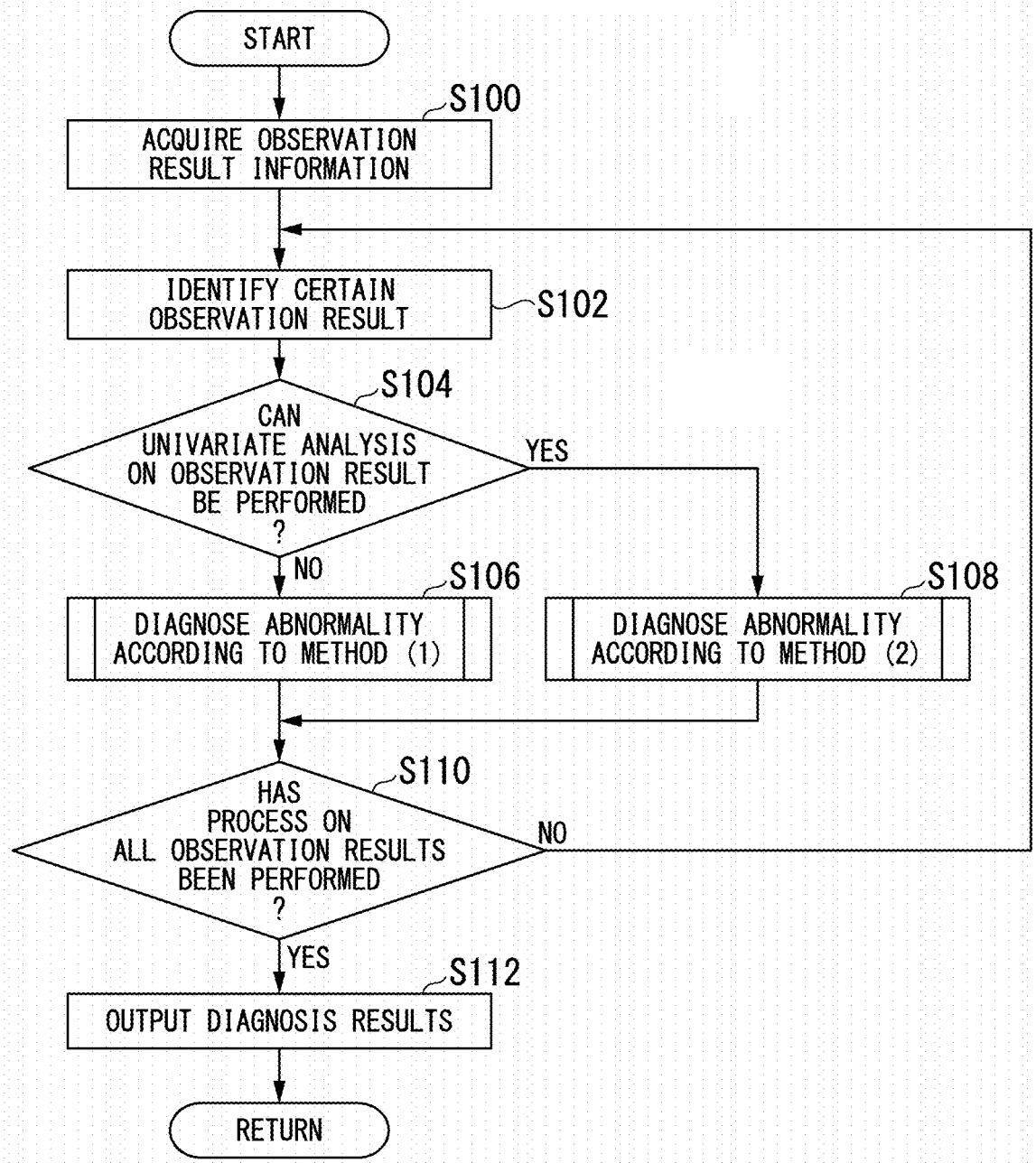
FIG. 10 is a flowchart showing a flow of a series of processing of the abnormality diagnostic device.

Content of the operation of the abnormality diagnostic device 1 will be described below. FIG. 10 is a flowchart showing a flow of a series of processing of the abnormality diagnostic device 1. First, the acquirer 102 acquires the observation result information 300 from log information of an abnormality diagnostic target (step S100). Next, the diagnoser 104 identifies a certain observation result from the observation result information 300 acquired by the acquirer 102 (step S102).

The diagnoser 104 determines whether or not univariate analysis on the identified observation result can be performed (step S104). The univariate analysis is an analysis method of diagnosing a type of abnormality in the abnormality diagnostic target on the basis of an observation result related to a certain type (for example, a certain sensor). On the other hand, the multivariate analysis is an analysis method of diagnosing the type of abnormality in the abnormality diagnostic target on the basis of a plurality of observation results. An observation result on which univariate analysis can be performed is, for example, an observation result from which a change or an abnormality related to an operation of an abnormality diagnostic target is read according to an observation result for a certain type and is an observation result in which a sharp change occurs among observation results within a predetermined time period. An observation result on which univariate analysis cannot be performed (i.e., an observation result on which multivariate analysis is required to be performed) is an observation result from which a change or an abnormality related to an operation of an abnormality diagnostic target is read according to a correlation with another observation result and is an observation result in which a change in the observation result within a predetermined time period is small (i.e., a time constant is large).

When the univariate analysis on the identified observation result cannot be performed, the diagnoser 104 diagnoses the type of abnormality in the abnormality diagnostic target according to the "(1) method using the dissimilarity distance evaluated according to the complex power cepstrum or the like" (step S106). When a univariate analysis on the identified observation result can be performed, the diagnoser 104 diagnoses the type of abnormality in the abnormality diagnostic target according to the "(2) method using the dissimilarity distance evaluated according to the DTW or the like" (step S108). Details of the processing of steps S106 and S108 will be described below. The diagnoser 104 iterates the processing of steps S102 to S108 until the process of diagnosing the abnormality diagnostic target is performed on the basis of all the observation results included in the observation result information 300 (step S110). The output 112 outputs information representing a diagnostic result of diagnosis performed by the diagnoser 104 (step S112). The diagnosis result includes, for example, a type of abnormality diagnosed as an abnormality in step S106 or step S108. When it is diagnosed that the abnormality in the abnormality diagnostic target does not correspond to any type of abnormality, the diagnoser 104 may diagnose that there is no abnormality in the abnormality diagnostic target. In this case, the diagnosis result may indicate that there is no abnormality in the abnormality diagnostic target.

[Processing Flow: (1) Method Using Dissimilarity Distance Evaluated According to Complex Power Cepstrum or Like]

Figure 11:
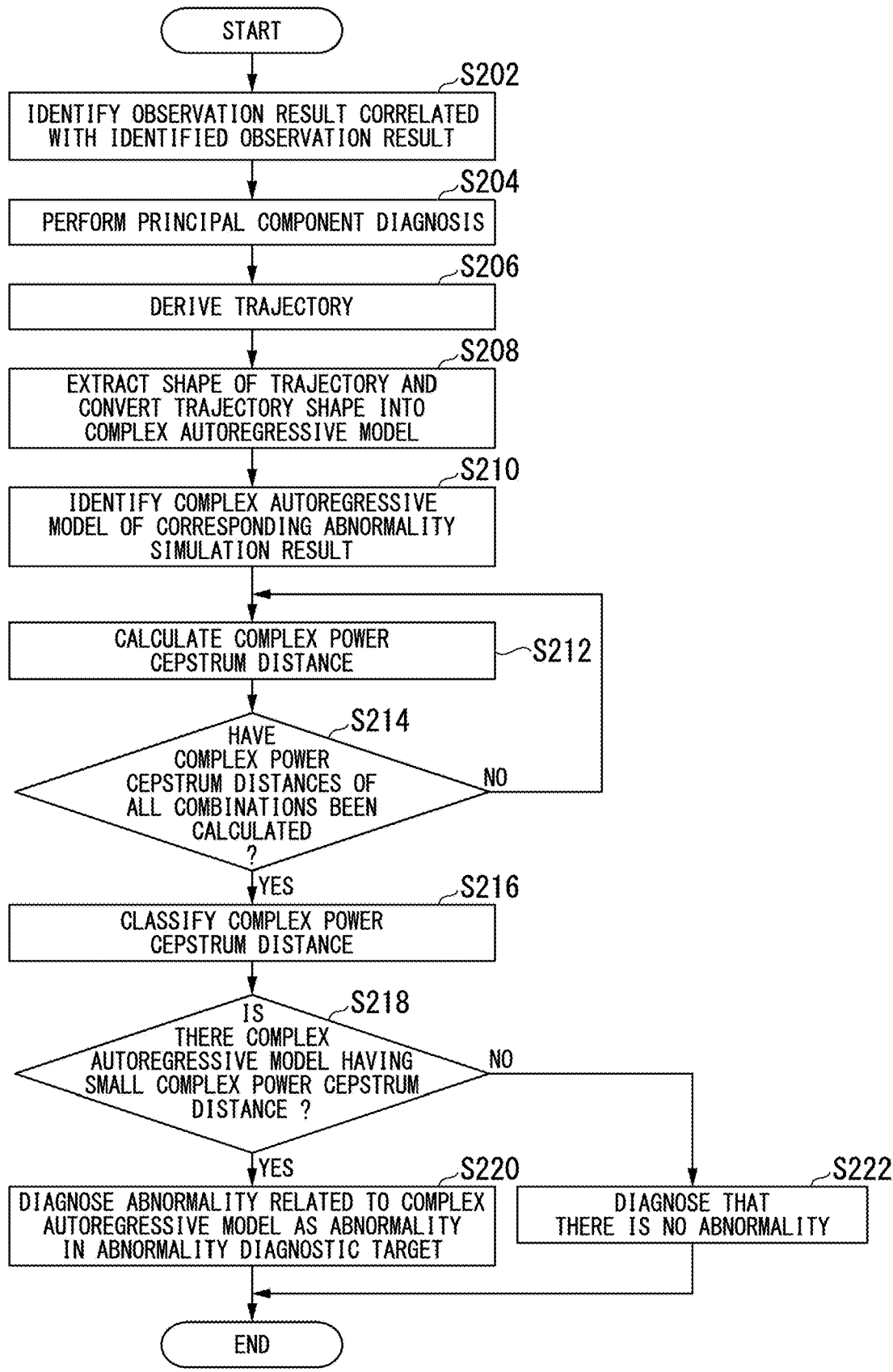
FIG. 11 is a flowchart showing a flow of a series of processing of a process of step S106 in FIG. 10.

Hereinafter, details of a process in which the diagnoser 104 diagnoses the type of abnormality in the abnormality diagnostic target according to (1) method using the dissimilarity distance evaluated according to the complex power cepstrum or the like will be described. FIG. 11 is a flowchart showing a flow of a series of processing of the process of step S106 in FIG. 10. First, the diagnoser 104 identifies a second observation result correlated with a first observation result identified in step S102 on the basis of the correlation information 206 (step S202). Even if there are a plurality of second observation results, the diagnoser 104 can perform collective analysis by reconstructing each observation result to multidimensional data as an element. If necessary, a certain observation result can be identified as a second observation result and other observation results can be processed later. Also, if the sensor used as the second observation result is optimized according to the method to be described below, the subsequent analysis can be performed with two optimum sensors, so that it is possible to reduce the calculation load as compared with a case in which a phase plane trajectory is created with a combination of three or more sensors. The trajectory deriver 106 can perform a collective PCA process by reconstructing the two observation results identified by the diagnoser 104 to multidimensional data having each observation result as an element (step S204). The trajectory deriver 106 may perform a PCA process for each sensor instead of a configuration in which a collective PCA process is performed. Hereinafter, it is assumed that the trajectory deriver 106 performs a collective PCA process for each sensor group. The trajectory deriver 106 derives a trajectory on the phase plane on the basis of a plurality of derived principal components (scores) (step S206). For example, this phase plane is a phase plane in which the first axis (for example, the horizontal axis) represents the first principal component score x and the second axis (for example, the vertical axis) represents the second principal component score y in the bivariate case. The trajectory deriver 106 derives a trajectory by connecting coordinates (coordinates (x1, y1), . . . , coordinates (xm, ym) shown in FIG. 7) representing elements whose detection timings match among elements {x1, x2, . . . , xm} included in the first principal component score x and elements {y1, y2, . . . , ym} included in the second principal component score y with a straight line.

The first difference calculator 108 extracts shapes of all trajectories derived by the trajectory deriver 106 and converts the extracted trajectory shapes into complex autoregressive models (step S108). The first difference calculator 108 identifies a plurality of complex autoregressive models related to abnormality simulation results corresponding to the first observation result and the second observation result on the basis of the complex autoregressive model information 208 (step S210). The first difference calculator 108 selects two certain complex autoregressive models from the complex autoregressive models obtained through the conversion in step S208 and the complex autoregressive models identified in step S210 and calculates a complex power cepstrum distance Dc representing a difference between the selected complex autoregressive models (step S212). The first difference calculator 108 iterates step S212 until the complex power cepstrum distance Dc for each of all combinations in which two certain complex autoregressive models are selected is calculated (step S214).

The diagnoser 104 classifies the complex power cepstrum distance Dc calculated in step S212 according to hierarchical clustering (step S216). As a result of the hierarchical clustering, the diagnoser 104 determines a complex autoregressive model in which the complex power cepstrum distance Dc from the complex autoregressive model related to the observation result is smaller than a predetermined value (i.e., a complex autoregressive model of a homogeneous abnormality) (step S218). The diagnoser 104 diagnoses a type of abnormality related to the complex autoregressive model in which the complex power cepstrum distance Dc from the complex autoregressive model related to the observation result is smaller than the predetermined value as the type of abnormality in the abnormality diagnostic target (step S220). The diagnoser 104 diagnoses that there is no abnormality in the abnormality diagnostic target when there is no complex autoregressive model in which the complex power cepstrum distance Dc from the complex autoregressive model related to the observation result is smaller than the predetermined value (step S222). The diagnoser 104 may determine a complex autoregressive model having a smallest complex power cepstrum distance Dc from the complex autoregressive model related to the observation result and diagnose the type of abnormality related to the complex autoregressive model as the abnormality in the abnormality diagnostic target.

[Processing Flow: (2) Method Using Dissimilarity Distance Evaluated According to DTW or Like]

Figure 12:
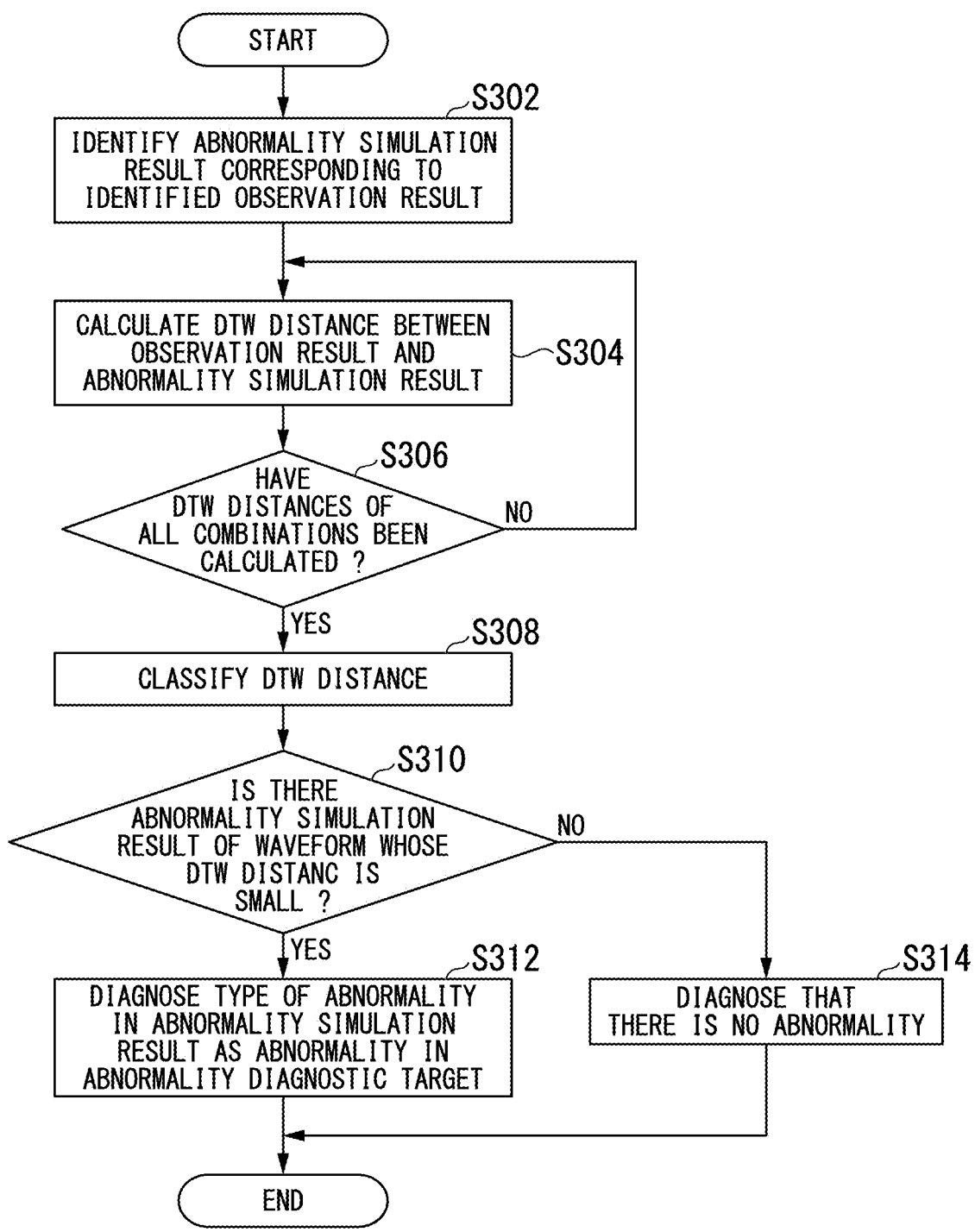
FIG. 12 is a flowchart showing a flow of a series of processing of a process of step S108 in FIG. 10.

Hereinafter, details of a process in which the diagnoser 104 diagnoses the type of abnormality in the abnormality diagnostic target according to (2) method using the dissimilarity distance evaluated according to the DTW or the like will be described. FIG. 12 is a flowchart showing a flow of a series of processing of the process of step S108 in FIG. 10. First, the diagnoser 104 identifies a plurality of abnormality simulation results for each type of abnormality corresponding to the first observation result identified in step S102 on the basis of the abnormality simulation information 202 (step S302). The second difference calculator 110 selects two of the identified first observation result and a plurality of abnormality simulation results and calculates a dissimilarity distance which is evaluated according to the DTW or the like between waveforms representing a change over time in the difference between the selected observation result or abnormality simulation result and a normal state simulation result (step S304). The second difference calculator 110 iterates the processing of step S304 until the dissimilarity distance for each of all combinations in which two of the identified first observation result and the plurality of abnormality simulation results are selected is calculated (step S306).

The diagnoser 104 classifies the complex power cepstrum distance Dc derived in step S304 according to hierarchical clustering (step S308). As a result of hierarchical clustering, the diagnoser 104 determines whether or not there is an abnormality simulation result of a waveform whose complex power cepstrum distance Dc from the waveform related to the observation result is smaller than a predetermined value (i.e., a waveform of a homogenous abnormality) (step S310). When there is an abnormality simulation result of a waveform whose DTW distance from the waveform related to the observation result is smaller than the predetermined value, the diagnoser 104 diagnoses the type of abnormality in the abnormality simulation result as the type of abnormality in the abnormality diagnostic target (step S312). When there is no abnormality simulation result of the waveform whose DTW distance from the waveform related to the observation result is smaller than the predetermined value, the diagnoser 104 diagnoses that there is no abnormality in the abnormality diagnostic target (step S314). The diagnoser 104 may determine the waveform having the smallest DTW distance related to the observation result, and diagnose the type of abnormality related to the abnormality simulation result of the waveform as the abnormality in the abnormality diagnostic target.

[When Univariate Analysis and Multivariate Analysis Are Performed]

Although a case in which the diagnoser 104 determines whether or not univariate analysis on the observation result can be performed in step S104 of FIG. 10, diagnoses an abnormality according to the "(1) method using the dissimilarity distance evaluated according to the complex power cepstrum or the like" when the univariate analysis cannot be performed, and diagnoses an abnormality according to the "(2) method using the dissimilarity distance evaluated according to the DTW or the like" when the univariate analysis can be performed has been described above, the present invention is not limited thereto. For example, a configuration in which the diagnoser 104 diagnoses an abnormality according to processes of both the "(1) method using the dissimilarity distance evaluated according to the complex power cepstrum or the like" (i.e., step S106) and the "(2) method using the dissimilarity distance evaluated according to the DTW or the like" (i.e., step S108) with respect to the observation result identified in step S102 may be adopted. For example, when the diagnoser 104 diagnoses an abnormality according to both (1) method and (2) method, it is possible to diagnose an abnormality even if it is not ascertained in advance whether or not univariate analysis on the observation result can be performed.

MODIFIED EXAMPLE

Hereinafter, a modified example according to the present embodiment will be described. In the above-described embodiment, a case in which the abnormality diagnostic device 1 diagnoses the abnormality in the abnormality diagnostic target on the basis of all abnormality simulation results related to the first observation result and the second observation result has been described. In the modified example, a case in which an abnormality diagnostic device 1a diagnoses the abnormality in the abnormality diagnostic target with a phase plane trajectory formation contribution rate using a principal component load quantity (hereinafter simply referred to as a "phase plane trajectory formation contribution rate") will be described. Components similar to those in the above-described embodiment are denoted by the same reference signs and the description thereof will be omitted. In the present method, when there are a plurality of sensors showing abnormal values, narrowing the number of pairs of high-sensitive sensors for use in abnormality diagnosis (the number of high-sensitive sensors in the case of univariate analysis in which no phase plane trajectory is generated) to one is used as a method of reducing the calculation load.

Figure 13:
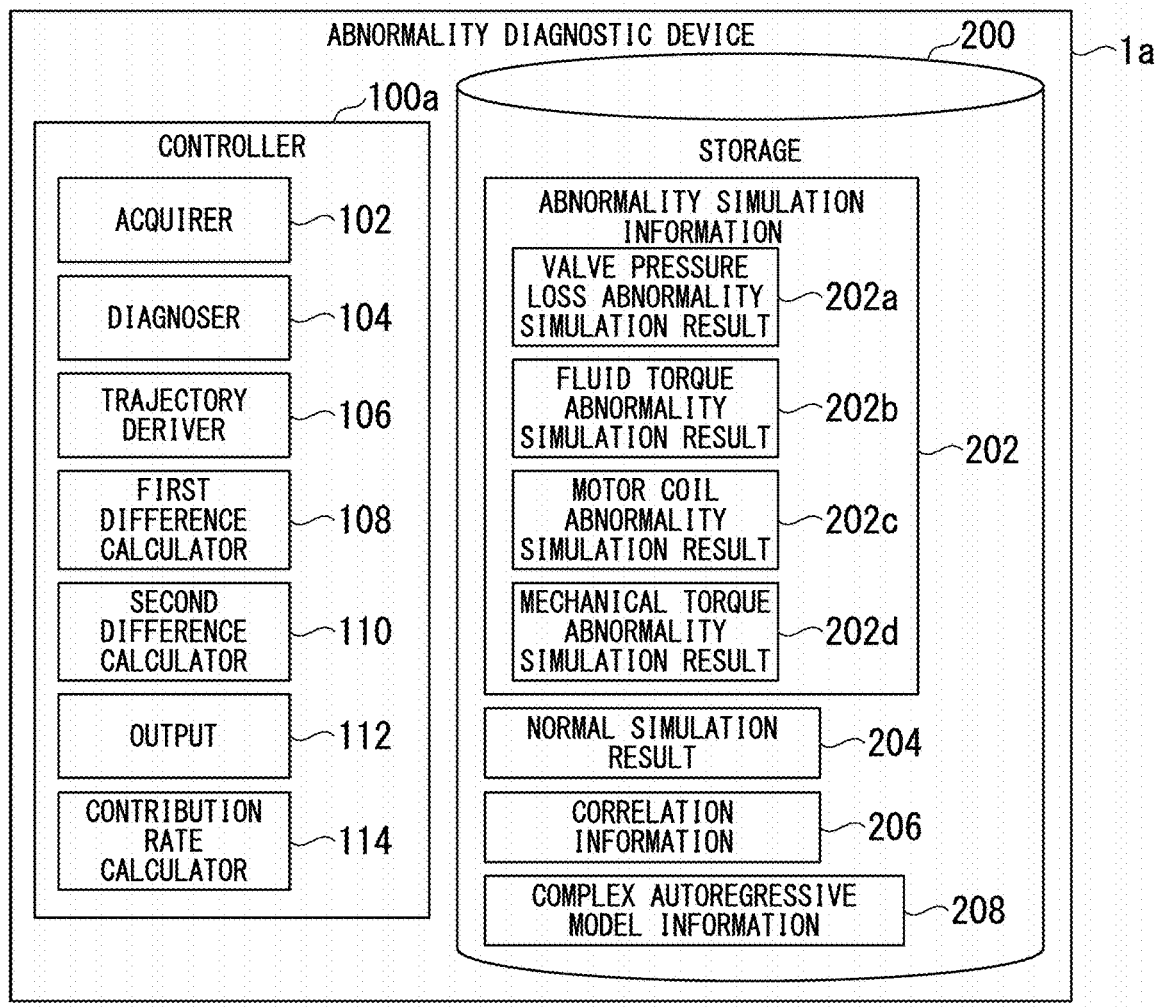
FIG. 13 is a diagram showing an example of a configuration of an abnormality diagnostic device according to a modified example.

FIG. 13 is a diagram showing an example of a configuration of the abnormality diagnostic device 1a according to the modified example. The abnormality diagnostic device 1a of the modified example includes a controller 100a and a storage 200 in place of (or in addition to) the configuration provided in the abnormality diagnostic device 1. The controller 100a includes an acquirer 102, a diagnoser 104, a trajectory deriver 106, a first difference calculator 108, a second difference calculator 110, an output 112, and a contribution rate calculator 114 in place of (or in addition to) the configuration provided in the controller 100.

As described above, for example, the diagnoser 104 identifies all abnormality simulation results corresponding to a first observation result and a second observation result and performs diagnosis of the abnormality diagnostic target on the basis of a trajectory Orb2 derived on the basis of the identified abnormality simulation result or a dissimilarity distance evaluated according to DTW or the like. Here, the abnormality simulation result may not show the abnormality in the abnormality diagnostic target with high sensitivity. The contribution rate calculator 114 calculates a degree of contribution of each sensor forming the phase plane trajectory related to the diagnosis of the abnormality diagnostic target (i.e., the phase plane trajectory formation contribution rate) with respect to each abnormality simulation result. When the phase plane trajectory formation contribution rate calculated by the contribution rate calculator 114 is high, the diagnoser 104 of the modified example identifies a result showing the abnormality in the abnormality diagnostic target with high sensitivity and performs the diagnosis of the abnormality diagnostic target on the basis of the trajectory Orb2 derived on the basis of the identified abnormality simulation result or a dissimilarity distance.

Hereinafter, content of a process of the contribution rate calculator 114 when an optimum abnormality simulation result representing the abnormality with high sensitivity in a certain abnormality is identified using the phase plane trajectory formation contribution rate will be described. First, the contribution rate calculator 114 performs a collective PCA process in the above-described method using abnormality simulation results related to k sensors for a certain abnormality and performs calculation for first to $k^{th}$ principal components. For example, the contribution rate calculator 114 calculates a cumulative contribution rate of each principal component and selects a principal component having a high contribution rate (for example, first and second principal components) on the basis of the calculated cumulative contribution rate. The cumulative contribution rate of each principal component is a sum of values (contribution rates of each principal component) obtained by dividing an eigenvalue of each principal component by a sum of eigenvalues of principal components. It is shown that, when the contribution rate value is larger, an amount of information lost according to a dimension reduction effect of the PCA process is smaller. Further, the contribution rate calculator 114 calculates a phase plane trajectory formation contribution rate when the phase plane trajectory is formed using principal components (for example, first and second principal components) selected on the basis of the cumulative contribution rate of each principal component using a principal component load quantity. The principal component load quantity is a correlation coefficient between a principal component score and each factor (each factor in the present example is an observed value for each sensor). It is shown that the sensor having the higher phase plane trajectory formation contribution rate contributes to the formation of the phase plane trajectory derived using the principal component score and contributes to the extraction of a feature using the phase plane trajectory. If there are k sensors, a first principal component load quantity, a second principal component load quantity, . . . , a $k^{th}$ principal component load quantity can be obtained for each sensor. For example, the contribution rate calculator 114 can generate a phase plane trajectory with the first principal component and the second principal component when there are two sensors measuring the abnormality and can obtain a sum of a square of the first principal component load quantity and a square of the second principal component load quantity as the phase plane trajectory formation contribution rate of each sensor related to the phase plane trajectory formation.

Figure 14:
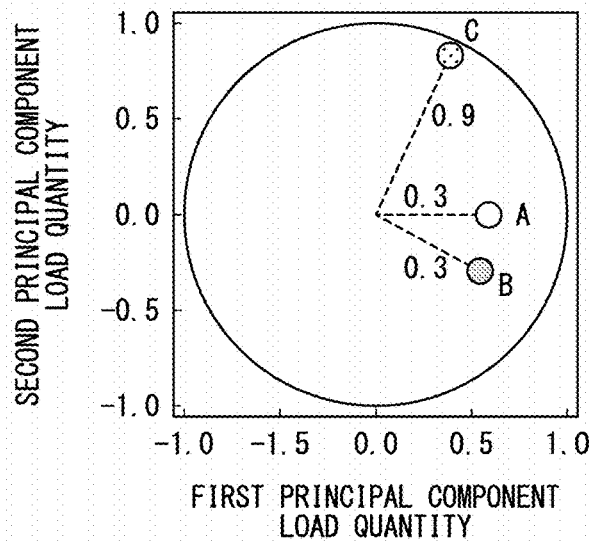
FIG. 14 is a diagram showing an example of a contribution rate.

FIG. 14 is a diagram showing an example of the contribution rate. The vertical axis shown in FIG. 14 represents a value of the second principal component load quantity (a degree of contribution to the formation of the principal component score is higher when a correlation coefficient between the principal component score and each factor is larger) and the horizontal axis represents a value of the first principal component load quantity. In FIG. 14, values of first principal component load quantities and values of second principal component load quantities of sensors related to the abnormality simulation result when there are three sensors A to C for measuring the abnormality when a certain abnormality has occurred are shown at points (points A to C) serving as coordinates. This abnormality simulation result is an abnormality simulation result when a phase plane trajectory is formed by performing a sensor-group-specific principal component score acquisition process using three-sensor information. In FIG. 14, a degree of contribution calculated by the contribution rate calculator 114 is highest in sensor C and is lowest in sensor A. In some cases, it is possible to uniquely determine the abnormality simulation result that shows the abnormality in the case of this abnormality example with high sensitivity only from a ratio of the phase plane trajectory formation contribution rates of these three sensors. Also, when a plurality of sensors are associated with an abnormality, it is possible to reduce the overall calculation load because the number of sensors that execute a PCA process can be reduced by limiting the number of sensors of interest using this phase plane trajectory formation contribution rate. The above result can also be used for parameter estimation or data assimilation when a simulation model for deriving abnormality simulation results is constructed. Also, for example, because the diagnoser 104 can detect the abnormality with high sensitivity by paying attention to the behavior of sensor C in the above abnormality case example, it is possible to reduce false diagnosis and efficiently perform abnormality diagnosis by performing the above-described analysis in a combination including sensor C. It can also be used as a criterion for determining the accuracy or appropriateness of abnormality simulation results. For example, when it is possible to uniquely determine the abnormality simulation result that indicates the abnormality with high sensitivity in the above abnormality example from only the ratio of the phase plane trajectory formation contribution rates, it is possible to improve the reliability and diagnosis efficiency of abnormality diagnosis by selecting an abnormality simulation result with a ratio of similar phase plane trajectory formation contribution rates between the sensors among a plurality of simulation results having different abnormality as an abnormality simulation result for use in the diagnosis of the abnormality diagnostic target and using the selected abnormality simulation result for the diagnosis of the abnormality diagnostic target. As described above, the optimization of the abnormality simulation result is implemented through the optimization of the sensor for deriving the abnormality simulation result showing the abnormality with high sensitivity using the phase plane trajectory formation contribution rate, so that the abnormality diagnostic device 1a of the modified example can reduce the load related to the process of the diagnoser 104, the trajectory deriver 106, the first difference calculator 108, and the second difference calculator 110 and can perform accurate diagnosis. Because it is estimated that sensors having a ratio of phase plane trajectory formation contribution rates which are substantially the same have a strong correlation and causal relationship, this result can also be used for creating the correlation information 206.

[Scrutiny of Sensors Mounted on Abnormality Diagnostic Targets]

Although a case in which the phase plane trajectory formation contribution rate calculated by the contribution rate calculator 114 is used for optimizing the abnormality simulation result for deriving the abnormality simulation result representing the abnormality with high sensitivity in the diagnoser 104 has been described above, the examples of the present invention are not limited thereto. The sensor with a low phase plane trajectory formation contribution rate calculated by the contribution rate calculator 114 is likely to be directly involved in the cause of the abnormality even if information related to an operation of an abnormality diagnostic target device or system is not observed with high sensitivity. When it is identified whether or not there is a corresponding abnormality simulation result from the sensor information, the phase plane trajectory formation contribution rate of such a sensor can also be used. Also, the output 112 may output information representing the phase plane trajectory formation contribution rate calculated and output by the contribution rate calculator 114 and prompt a designer of the abnormality diagnostic target device or system to review sensors disposed in an abnormality diagnostic target.

[Diagnosis of Abnormal Diagnostic Target Based on Normal Simulation Results]

Although a case in which the trajectory deriver 106, the first difference calculator 108, and the second difference calculator 110 calculate the trajectory Orb2 and the dissimilarity distance based on the abnormality simulation results shown in the abnormality simulation information 202 has been described above, the present invention is not limited thereto. The trajectory deriver 106, the first difference calculator 108, and the second difference calculator 110 may calculate the trajectory Orb2 or the dissimilarity distance on the basis of normal simulation results shown in the normal simulation information 204. In this case, the diagnoser 104 may diagnose that there is no abnormality in the abnormality diagnostic target when a complex power cepstrum distance Dc between a complex autoregressive model based on an observation result and a complex autoregressive model based on a normal simulation result is smaller than a predetermined value (i.e., the complex power cepstrum distance Dc is short). The diagnoser 104 may diagnose that there is no abnormality in the abnormality diagnostic target when a DTW distance between a waveform showing a change over time in an observation result and a waveform showing a change over time in a normal simulation result is smaller than a predetermined value (i.e., the DTW distance is short). The above method can be used for detecting abnormalities. However, when an abnormality has been detected here, it may be necessary to perform the collation with the above-described abnormality simulation result so that the cause of the abnormality is diagnosed.

Although modes for carrying out the present invention have been described using embodiments, the present invention is not limited to the embodiments and various modifications and substitutions can also be made without departing from the scope and spirit of the present invention.

REFERENCE SIGNS LIST 1, 1a Abnormality diagnostic device
100, 100a Controller
102 Acquirer
104 Diagnoser
106 Trajectory deriver
108 First difference calculator
110 Second difference calculator
112 Output
114 Contribution rate calculator
200 Storage
202 Abnormality simulation information
204 Normal simulation information
206 Correlation information
208 Complex autoregressive model information
300 Observation result information

The invention claimed is:

1. An abnormality diagnostic device comprising:
a processor configured to execute a program to diagnose a type of abnormality that occurs in an abnormality diagnostic target, which is a device or a system, on the basis of differences between abnormality simulation results for each type of abnormalities obtained by simulating a plurality of types of abnormalities in the abnormality diagnostic target and a plurality of time-series observation results obtained by observing the abnormality diagnostic target in time series using a plurality of detectors,
wherein
the processor is further configured:
to reconstruct the plurality of time-series observation results to multidimensional data in which a combination of time-series observation results of two or more of the plurality of detectors are collected for each observation time among the plurality of time-series observation results, and to set a plurality of combinations of two analysis results among a plurality of analysis results obtained through principal component analysis on the reconstructed multidimensional data;
to derive a plurality of first trajectories on a phase plane in which a first axis represents a principal component related to one time-series observation result, a second axis represents a principal component analysis result related to the other time-series observation result, and corresponding elements are set as coordinates for each of the plurality of combinations of the two analysis results; and
to diagnose a type or a cause of the abnormality on the basis of a difference between a shape of each of the plurality of first trajectories and a shape of each of a plurality of second trajectories on a phase plane in which a first axis represents a principal component of an abnormality simulation result corresponding to the first axis related to the first trajectory, a second axis represents a principal component of an abnormality simulation result corresponding to the second axis of an observation result related to the first trajectory, and corresponding elements are set as coordinates on the basis of a combination of abnormality simulation results matching a combination of observation results related to each of the plurality of first trajectories among a plurality of abnormality simulation results, and
wherein
the processor is further configured:
to convert the shape of each of the plurality of second trajectories and the shape of each of the plurality of first trajectories for each type of abnormality according to complex autoregressive models and to calculate a plurality of dissimilarity distances between the complex autoregressive models used for the conversion; and
to identify the shape of the second trajectory having a smallest dissimilarity distance from the shape of the first trajectory among the calculated plurality of dissimilarity distances and to diagnose a type of abnormality related to the identified second trajectory as the type of abnormality in the abnormality diagnostic target.

2. The abnormality diagnostic device according to claim 1, wherein the processor is further configured to derive the first trajectory with respect to a correlated time-series observation result among the plurality of time-series observation results.

3. The abnormality diagnostic device according to claim 1, wherein the processor is further configured to derive the first trajectory with respect to an uncorrelated time-series observation result among the plurality of time-series observation results.

4. The abnormality diagnostic device according to claim 1, wherein the processor is further configured:

to calculate dissimilarity distances between a first waveform representing a change over time in an observation result which is an abnormality diagnostic target among the plurality of time-series observation results and a plurality of second waveforms representing changes over time in abnormality simulation results of the plurality of time-series observation results for each type of abnormality according to a Dynamic Time Warping; and to identify the second waveform having a smallest dissimilarity distance from the first waveform among the calculated dissimilarity distances from among the plurality of second waveforms and to diagnose a type of abnormality related to the identified second waveform as the type of abnormality in the abnormality diagnostic target.

5. The abnormality diagnostic device according to claim 1, wherein the processor is further configured to classify the dissimilarity distance according to a classification method and to diagnose a type of abnormality related to the abnormality simulation result of a cluster having a smallest dissimilarity distance from information related to the time-series observation result among classified clusters as the type of abnormality in the abnormality diagnostic target.

6. The abnormality diagnostic device according to claim 1, wherein the processor is further configured:
to calculate a contribution rate related to phase plane trajectory formation for each of the plurality of detectors included in the time-series observation result and the abnormality simulation result on the basis of a principal component load quantity obtained through time-series principal component multivariate analysis on the time-series observation result and the abnormality simulation result; and
to diagnose the type of abnormality using the abnormality simulation result related to the contribution rate when the calculated contribution rate is greater than a predetermined value and not to diagnose the type of abnormality using the abnormality simulation result related to the contribution rate when the contribution rate is less than or equal to the predetermined value.

7. An abnormality diagnostic method comprising:
diagnosing, by a computer, a type of abnormality that occurs in an abnormality diagnostic target, which is a device or a system, on the basis of differences between abnormality simulation results for each type of abnormalities obtained by simulating a plurality of types of abnormalities in the abnormality diagnostic target and a plurality of observation results obtained by observing the abnormality diagnostic target using a plurality of detectors,
wherein
the diagnosing of the type of abnormality comprises:
reconstructing the plurality of time-series observation results to multidimensional data in which a combination of time-series observation results of two or more of the plurality of detectors are collected for each observation time among the plurality of time-series observation results, and setting a plurality of combinations of two analysis results among a plurality of analysis results obtained through principal component analysis on the reconstructed multidimensional data;
deriving a plurality of first trajectories on a phase plane in which a first axis represents a principal component related to one time-series observation result, a second axis represents a principal component analysis result related to the other time-series observation result, and corresponding elements are set as coordinates for each of the plurality of combinations of the two analysis results; and
diagnosing a type or a cause of the abnormality on the basis of a difference between a shape of each of the plurality of first trajectories and a shape of each of a plurality of second trajectories on a phase plane in which a first axis represents a principal component of an abnormality simulation result corresponding to the first axis related to the first trajectory, a second axis represents a principal component of an abnormality simulation result corresponding to the second axis of an observation result related to the first trajectory, and corresponding elements are set as coordinates on the basis of a combination of abnormality simulation results matching a combination of observation results related to each of the plurality of first trajectories among a plurality of abnormality simulation results, and
wherein
the abnormality diagnostic method further comprises:
converting the shape of each of the plurality of second trajectories and the shape of each of the plurality of first trajectories for each type of abnormality according to complex autoregressive models and calculating a plurality of dissimilarity distances between the complex autoregressive models used for the conversion; and
identifying the shape of the second trajectory having a smallest dissimilarity distance from the shape of the first trajectory among the calculated plurality of dissimilarity distances and diagnosing a type of abnormality related to the identified second trajectory as the type of abnormality in the abnormality diagnostic target.

8. A non-transitory computer-readable storage medium storing a program for causing a computer to:
diagnose a type of abnormality that occurs in an abnormality diagnostic target, which is a device or a system, on the basis of differences between abnormality simulation results for each type of abnormalities obtained by simulating a plurality of types of abnormalities in the abnormality diagnostic target and a plurality of observation results obtained by observing the abnormality diagnostic target using a plurality of detectors,
wherein
the diagnosing of the type of abnormality comprises:
reconstructing the plurality of time-series observation results to multidimensional data in which a combination of time-series observation results of two or more of the plurality of detectors are collected for each observation time among the plurality of time-series observation results, and setting a plurality of combinations of two analysis results among a plurality of analysis results obtained through principal component analysis on the reconstructed multidimensional data;
deriving a plurality of first trajectories on a phase plane in which a first axis represents a principal component related to one time-series observation result, a second axis represents a principal component analysis result related to the other time-series observation result, and corresponding elements are set as coordinates for each of the plurality of combinations of the two analysis results; and
diagnosing a type or a cause of the abnormality on the basis of a difference between a shape of each of the plurality of first trajectories and a shape of each of a plurality of second trajectories on a phase plane in which a first axis represents a principal component of an abnormality simulation result corresponding to the first axis related to the first trajectory, a second axis represents a principal component of an abnormality simulation result corresponding to the second axis of an observation result related to the first trajectory, and corresponding elements are set as coordinates on the basis of a combination of abnormality simulation results matching a combination of observation results related to each of the plurality of first trajectories among a plurality of abnormality simulation results, and wherein the program further causes the computer:

to convert the shape of each of the plurality of second trajectories and the shape of each of the plurality of first trajectories for each type of abnormality according to complex autoregressive models and to calculate a plurality of dissimilarity distances between the complex autoregressive models used for the conversion; and to identify the shape of the second trajectory having a smallest dissimilarity distance from the shape of the first trajectory among the calculated plurality of dissimilarity distances and to diagnose a type of abnormality related to the identified second trajectory as the type of abnormality in the abnormality diagnostic target.

* * * * *